United States Patent [19]

Andreasson

[11] Patent Number: 4,673,015
[45] Date of Patent: Jun. 16, 1987

[54] CHAIN NET

[76] Inventor: Olof I. Andreasson, Tegen 2535, S-458 02 Ödeborg, Sweden

[21] Appl. No.: 630,089

[22] Filed: Jul. 12, 1984

[30] Foreign Application Priority Data

Jul. 26, 1983 [SE] Sweden ................................ 8304140

[51] Int. Cl.⁴ ....................... B60C 27/06; B21F 31/00; B66C 1/12
[52] U.S. Cl. ...................................... 152/231; 29/437; 29/450; 43/7; 59/78; 102/303; 152/171; 152/172; 152/239; 152/242; 245/4; 294/77; 428/52; 428/222
[58] Field of Search ............... 152/155, 170, 171, 172, 152/176, 177, 185.1, 231, 188, 189, 208, 232, 220, 217, 218, 219, 239, 241, 242, 243; 245/4, 9; 140/3 A; 294/77; 59/78, 79.1, 84, 3, 900; 29/453, 450, 437, 520, 515; 428/52, 222; 114/229, 241; 182/138–140; 43/7, 14; 102/303

[56] References Cited

U.S. PATENT DOCUMENTS

| | | | |
|---|---|---|---|
| 1,016,479 | 2/1912 | Coyne et al. ........................ | 245/4 X |
| 1,050,216 | 1/1913 | Holl .................................... | 245/4 X |
| 1,467,927 | 9/1923 | Doerres et al. ..................... | 152/239 |
| 3,662,539 | 5/1972 | Florjancic .......................... | 59/84 X |
| 4,361,178 | 11/1982 | Gower ............................. | 152/239 X |

Primary Examiner—David Simmons
Assistant Examiner—Thomas Bokan

[57] ABSTRACT

A chain net comprises a plurality of warp strands (1.1) with mutually equal links (1.2) which at intersections lock round links (1.5) of weft strands (1.4) having mutually equal links. The links of the warp strands have dimensions such that they first allow the insertion of weft strands and, after plastic or elastic deformation, lock links of the weft strands. The plastic deformation is provided by elongating the warp strands. The elastic deformation is provided by the warp strand links being first expanded to allow the insertion of weft strands, after which the warp links are elastically re-deformed for locking round weft links.

9 Claims, 12 Drawing Figures

CHAIN NET

BACKGROUND OF THE INVENTION

The present invention relates to a chain net comprising mutually intersecting chain strands with a plurality of warp strands locked to a plurality of weft strands at their intersections.

Chain net in accordance with the invention forms a reticulated structure with a plurality of substantially parallel strands, hereinafter designated warp strands, which are locked to a plurality of transverse, parallel strands, hereinafter designated weft strands.

Chain net comprising chain strands connected to each other are known in different variations. The chain strands in the net can form different patterns and be connected to each other, e.g. with the aid of special connecting loops which are inserted in the links of the chain strands and then locked. Such chain net implementations are used to a large extent as non-skid devices for vehicle tires.

The DE Offenlegungsschrift No. 2 459 279 illustrates such a non-skid device including annular chain strands along either side of the tire, to which are connected transverse or diagonal chain strands, the end links of the transverse strands thrusting into links of the annular side strands and at their free ends provided with a locking means for locking to side strands.

The DE Offenlegungsschrift No. 2 406 102 illustrates a similar non-skid device where the transverse links are terminated by a larger link with a sufficiently large inner opening to allow the side strand to be taken through it, this link then being compressed from the sides to lock the transverse strands to the side strands. A separate operation must therefore be carried out at every point of connection between the chain strands.

The invention has the object of providing a chain net of the kind disclosed in the introduction, which has a larger number of intersections between warp and weft strands and allows efficient and economical manufacture using a commercially available chain. The chain net in accordance with the invention can be manufactured of such steel chain in normally available dimensions, but can also be manufactured from chain having links of any material with suitable plastic or elastic properties. Chain strands of any material with the required deformation properties can be used for manufacturing the inventive net, whereby greatly varying requirements for the net can be satisfied.

SUMMARY OF THE INVENTION

In a preferred embodiment the warp strands consist of links with dimensions such as to allow the insertion of the weft strands through their links, these links then being deformed by elongation of the warp strands such as to lock around links of the weft strands. The link shanks of the weft strands will always be in the plane of the net.

The warp and weft strands can be combined in various ways. Every other link of the warp strand can thus be locked to every other link of the weft strand. Alternatively, each link of the warp strand can be connected to every other link of the weft strand. Finally, every link of the warp strand can be connected to every link of the weft strand. The weft strand links are then formed with link shanks pressed in opposite directions to allow these to assume a position in the plane of the net.

The warp links are usually elongated equally as much. It is however possible to subject the warp strands to a subsequent further elongation so that a net which can, for example, have a substantially rectangular plan profile is instead bounded by opposing curved end sides at the end of the warp links. The weft strands can also be subjected to a similar subsequent elongation if so desired. When such a net, e.g. of a rectangular shape, is suspended by its corners, the net will assume a curved shape, which is advantageous in some cases when the net is to be used for taking up objects, or in using the net as a so-called blasting mat, or in other cases.

In a particular embodiment, the chain net has a substantially rectangular plan profile, the warp strands and weft strands extending at a slope of about 45 degrees to the long sides of the profile to form a net hereinafter designated diagonal net.

The chain net in accordance with the invention can be used to advantage as a non-skid device for vehicle tires. Such a device has in plan profile an elongated, nearly rectangular shape. The device can be implemented with longitudinal warp strands which have increased elongation towards the longitudinal centre line of the profile. The weft strands extend nearly at right angles to the warp strands. The outer warp strands will be conventionally mounted on either side of the tire and be connected with the ends opposite each other. The inner warp strands are elongated in correspondence with the increased diameter of the tire so that their respective ends meet each other for connection.

A diagonal net for the corresponding purpose is connected on either long side to separate side strands with lengths suited to being connected at their ends in a desired position along the sides of the tire. The diagonally extending warp and weft strands will alter their mutual angular attitude on being mounted on the tire such that the entire net adjusts to the curved profile of the tire.

When in use as a non-skid device, it is in many cases suitable for the chain strands to be provided with studs before manufacturing the net so as to achieve improved grip on the substructure. Such studs can be efficiently provided by welding studs automatically on standard chains or by using special so-called stud chain produced by conventional resistance welding of open links with bent-out end portions.

In a still further embodiment, the chain net of the invention can include links of elastically deformable material such as plastics, rubber or the like. The warp strands are then made from the beginning with links of a configuration such that they lock around the weft links in the finished net but can assume in an elastically deformed state a configuration such that the weft strands can be inserted in the warp links. Both warp and weft strands are usually made with links of similarly elastic material, but the weft strands can alternatively be made of other material particularly suitable for the purpose. The chain net can be arranged in a varying manner in accordance with one of the patterns mentioned hereinbefore for nets with links of plastically deformable material.

For particular purposes it may be advantageous to make these elastic nets of material having a specific gravity of less than 1, whereby the net can float on water. Such nets may be used as direct floating bodies for different purposes, and generally when the net has some task in a maritime connection and by its buoyancy does not run the risk of sinking and being lost. In the latter case it may also be suitable to make the links from plastically deformable hollow sections for accordingly making the links buoyant.

The invention also relates to a method of manufacturing the net described hereinbefore. Characterizing for this method is that the weft strands are inserted through links in the warp strands at the intersections in the net, these warp links subsequently being caused by change of shape to lock around the weft links at the intersections. The change of shape can be achieved by warp links of plastically deformable material being elongated or by warp links of elastically deformable material being allowed to spring back into locking configuration after previously having been elastically deformed so that the weft strand can be inserted in the warp links.

The invention also relates to an apparatus for manufacturing a chain net. This apparatus includes means for the gradual, simultaneous advance of mutually parallel warp links, means for aligning a string of warp links in line with each other and with the broadsides of the links facing towards each other, means for inserting a weft strand in the thus aligned warp links and means for changing the shape of the warp links to surround weft links at the intersections in the net.

The fabricated chain net has a generally rectangular, more or less elongate configuration. When the warp links consist, for example, of plastically deformable material and extend in the longitudinal direction of the net, the warp links are first aligned with their broadsides directly opposing ech other along a line in the transverse direction of the net, subsequent to which a weft strand is drawn through these warp links. The warp strands are then elongated between fixed and movable gripping means in their longitudinal direction so that the warp links are deformed and lock around the weft links at the intersections of the net. After each elongating operation the net is advanced a number of link pitches in the longitudinal direction of the warp strands and subsequent sections of the warp strands are elongated in connection with the previously elongated sections. Advancing can be carried out with the aid of the movable elongating means or with the aid of a separate step feeding means.

For manufacturing a net with elastically deformable warp links, an apparatus is used including abutments which are placed against the end sides of the aligned elastic warp links. After alignment according to what has been said hereinbefore, these abutments are adjusted for preliminary change of shape of the warp links so that their inner opening is enlarged and allows the insertion of the weft strand. In this position the warp links are unloaded and return to their original shape so that they surround the respective weft links and lock these at the intersections. Means for aligning the warp links, means for drawing the weft links through and means for subsequent change of form of the warp links are thus put together into a common unit in this case, and this unit can extend at right angles to the longitudinal direction of the net or diagonally across the net. The warp strands are then fed in mutually parallel in their longitudinal direction or moved parallel as described for manufacturing diagonal net.

BRIEF DESCRIPTION OF THE DRAWING

The invention is described below in the form of an embodiment and with reference to the accompanying drawings which illustrate the chain net in accordance with the invention in different variants, as well as apparatus for making the net.

DETAILED DESCRIPTION OF PREFERRED EMBODIMENTS

Figure 1:
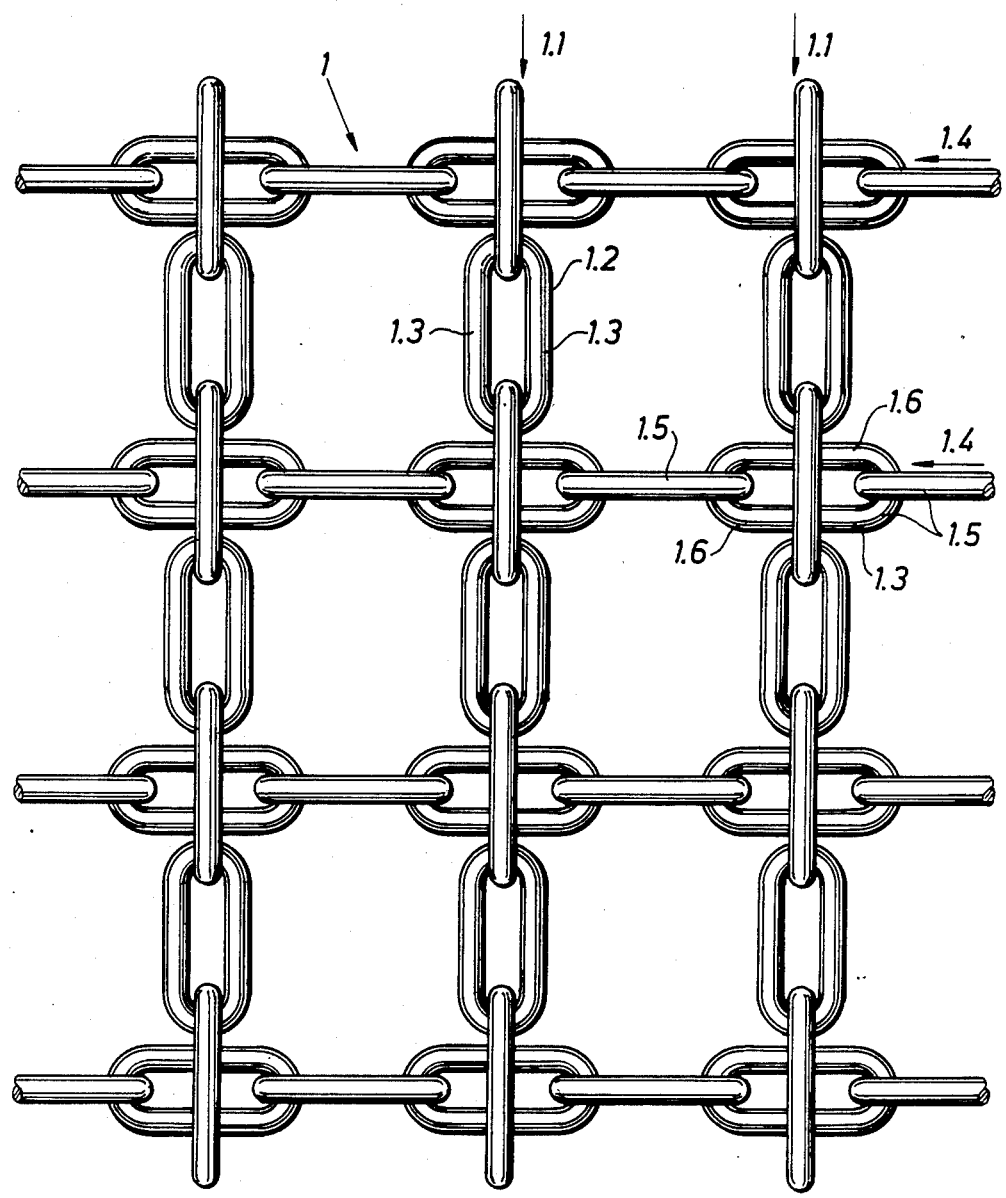
FIG. 1 illustrates a chain net with intersections at alternate links of the warp and weft strands.

FIG. 1 illustrates a chain net, generally denoted by the numeral 1, in accordance with the invention in a first embodiment. The net comprises a plurality of mutually parallel warp strands 1.1 made from commercially available chain and containing warp links 1.2 with warp link shanks 1.3 and a plurality of crossing weft strands 1.4 made from similarly commercially available chain containing weft links 1.5 with link shanks 1.6. Alternate warp links 1.2 are locked round the shanks of alternate weft links 1.5. The weft link is locked between the end portions of adjacent warp links and adjacent weft links. All the shanks 1.6 of the weft links are in a plane common with the net.

To provide the mentioned lock between warp and weft strands the warp links are deformed after the weft strands have been taken through the warp links. This lock and deformation can be carried out in two different ways, namely:

a. a warp strand containing plastically deformable links with sufficient inner opening for allowing insertion of the weft strand has been deformed by elongating the warp strand b. a warp strand containing elastically deformable links has been given a change of shape by pressure against the end portions of the link so that its inner opening has been enlarged sufficiently for allowing insertion of a weft strand, after which the pressure has been removed so that the warp link returns by its own elasticity to its original shape to lock round the weft link It will be noted that all links in both warp and weft strands are all the same in the finished net. The warp strands can be made, for example, from ordinary commercial steel chain, but in case of need can be also made from chain strands containing links of some other plastically deformable material which allows the necessary permanent deformation by elongating the link in its longitudinal direction to surround the weft link. The material in the warp links can thus be alloyed or unalloyed steel, stainless steel, bronze, brass, aluminium, aluminium alloy or similarly plastically deformable material.

The weft strands are also preferably made from the same material as the warp strands, but may also be made from some other material in the case where there is some reason for this to be suitable. Since the weft strands are not usually deformed, there is greater freedom in the selection of material for them.

For practical reasons the net is made with an elongate rectangular plan profile and can be manufactured practically unlimited in length. The width of the net can vary in practice, a greatest width in the order of magnitude of 1 meter can usually be suitable, but even greater widths can of course occur. Should there be a need of greater widths, two nets can be coupled together along their long sides without any problems with the aid of suitable locking means which are inserted in the mutually opposing end links of the weft strands.

In certain cases it is suitable to subject the warp strands to varying elongation. For example, when the net is to be used as a non-skid device, and thus includes two side strands intended to be mounted annularly on either side of a vehicle tire, with annular warp strands therebetween positioned at different diameters along the arched thread of the tire, there being transverse weft strands extending between the side strands, the intermediate warp strands must have successively increasing length towards the middle of the tire. Such a net is suitably manufactured starting from an already finished rectangular net, the warp strands situated between the long sides of the net being subjected to further elongation to the required length. Such further elongation is carried out with the aid of suitable conventional apparatus on each warp strand individually.

For certain purposes it may also be suitable to subject the weft strands to a subsequent similar elongation towards successively increased length towards the middle of the net. Such a net is given a bowl shape between its straight long sides and end sides. This bowl shape is particularly suitable in cases where the net is to cover a correspondingly bowl shaped sub-structure, e.g. for use as a damping net or so-called blasting mat in blasting work.

A particularly advantageous use of elongate rectangular nets with transverse weft strands is as endless tracks for crawler vehicles, the weft strands engaging in corresponding grooves on the driving wheels of the vehicle.

To increase friction against the sub-structure for both non-skid devices and endless tracks, the warp and weft strands can be provided to a suitable extent with projections or studs. The chain strands used can be provided beforehand with welded-on studs during manufacture, or such studs can be formed by resistance welding of the chain strands by means of the chain link being formed with bent-over ends before the final welding together.

Figure 2:
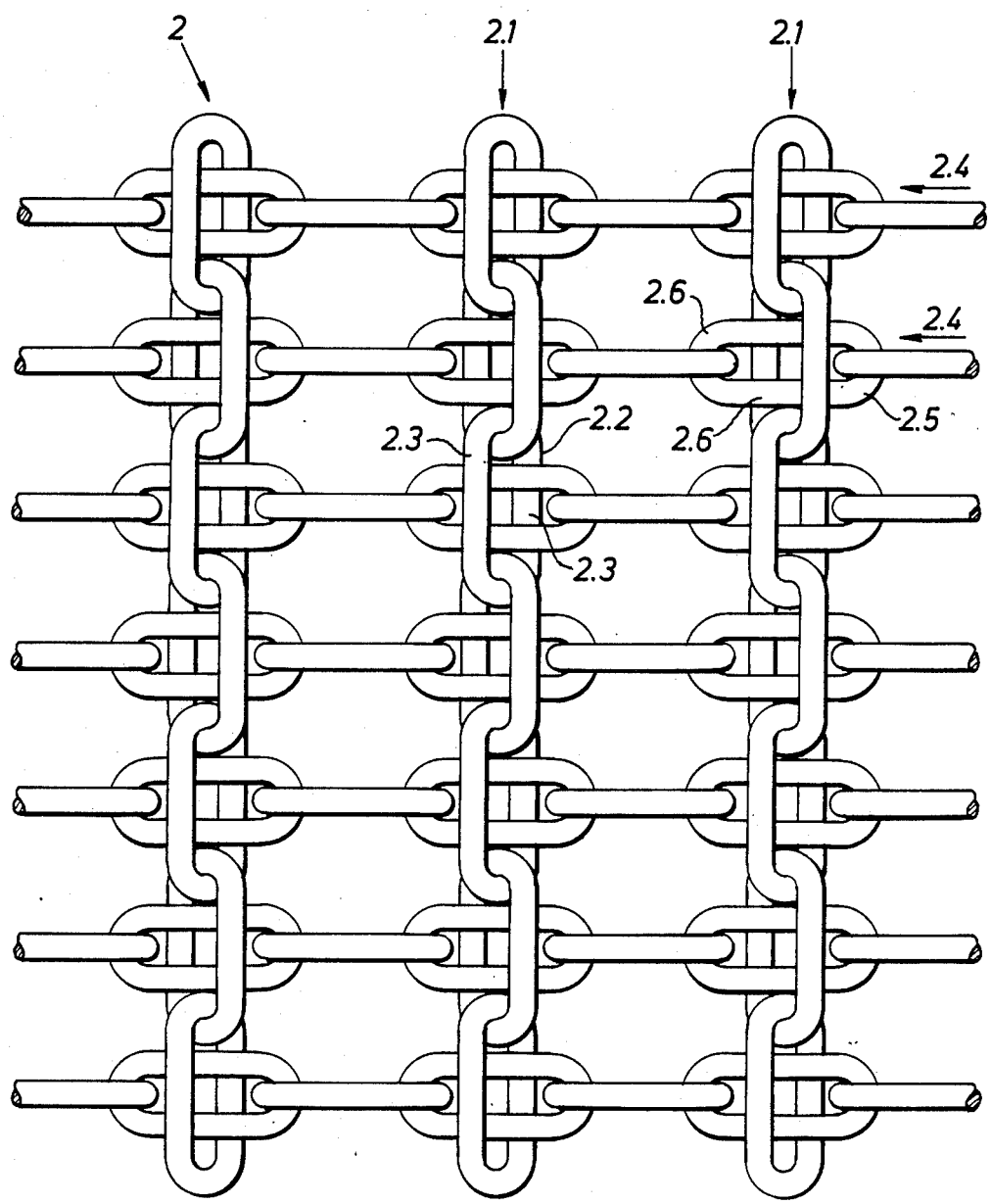
FIG. 2 illustrates a chain net with intersections at every link of the warp strands and alternate links of the weft strands.

FIG. 2 illustrates a further embodiment of the chain net in accordance with the invention. This net is generally denoted by 2. Each link 2.2 of the warp strands 2.1 surrounds alternate links 2.5 of the weft strands 2.4. In this case, the warp links are disposed at 45 degrees in successively opposing slopes towards the plane of the net, while the weft links 2.5 have their shanks 2.6 in the plane of the net. The shanks 2.3 of the warp links 2.2 are in this case closer to, or engage against, the weft shanks 2.6, the lock thus being tighter and with less play. The net 2 thus becomes less flexible than the more loosely jointed net 1. For the remainder, the net 2 has similar properties and possibilities of use as the net 1 and is manufactured in principally the same way from corresponding material.

Figure 3:
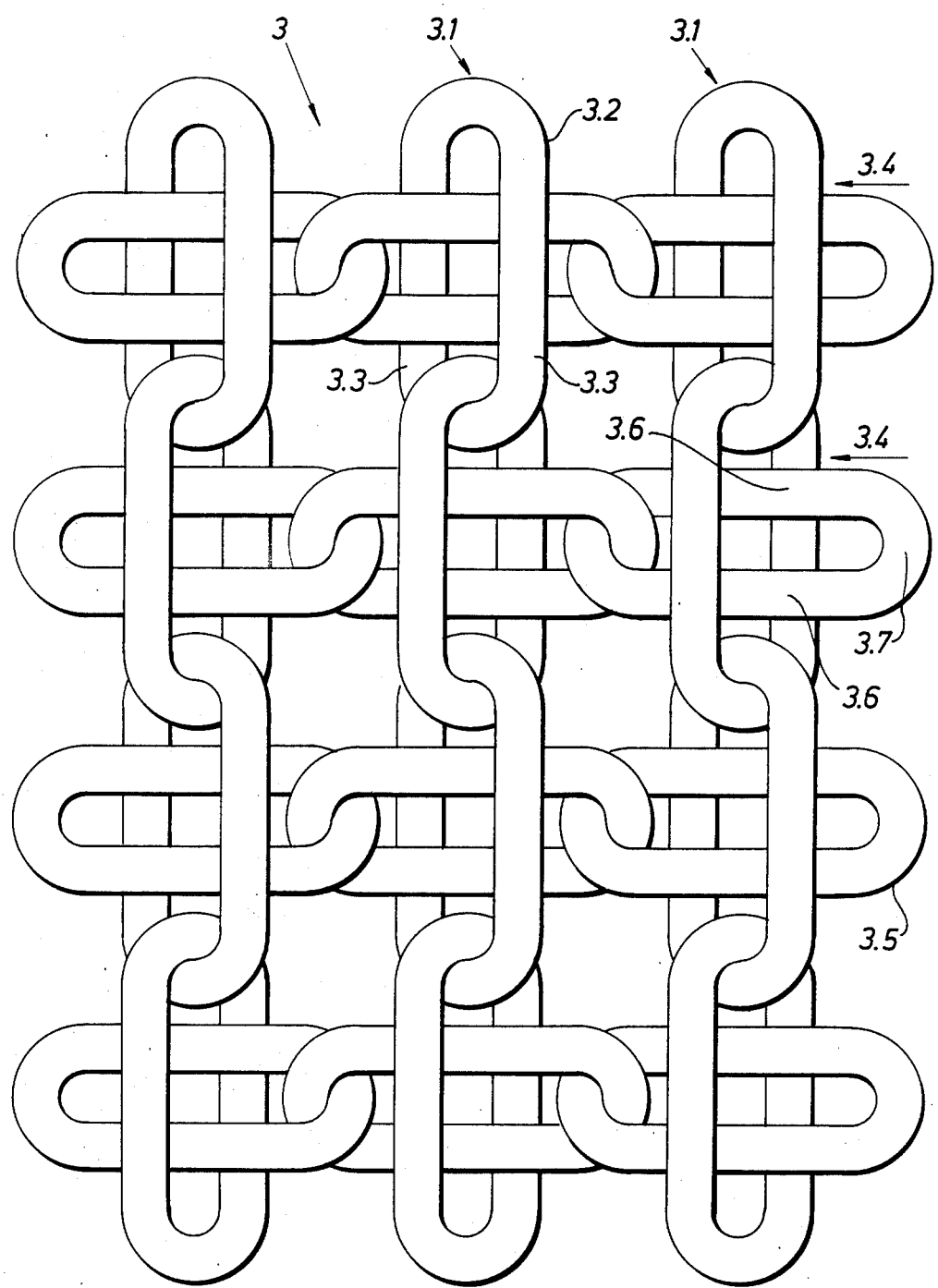
FIG. 3 illustrates a chain net with intersections at every link of the warp and weft strands.
Figure 5:
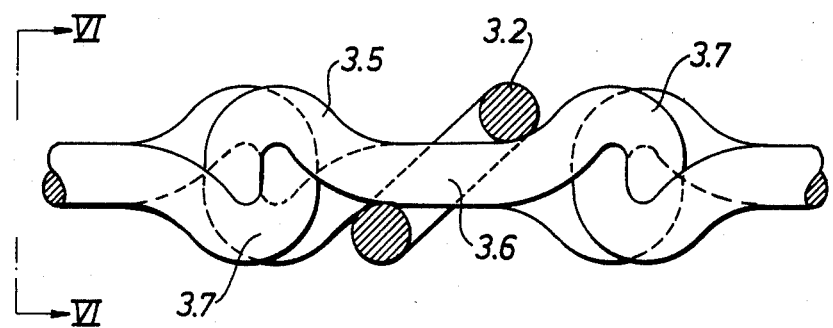
FIG. 5 illustrates a weft strand formed for intersections at every link of the weft strand.
Figure 6:
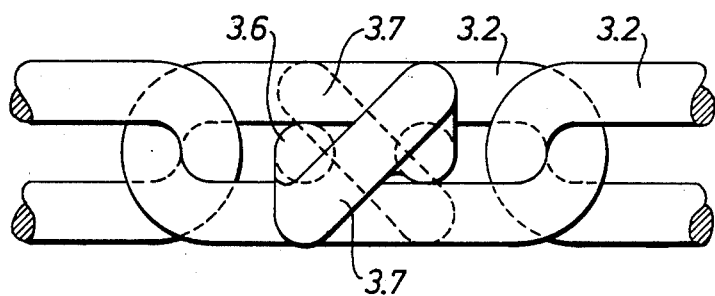
FIG. 6 illustrates this link seen along the line VI—VI in FIG. 5.
Figure 7:
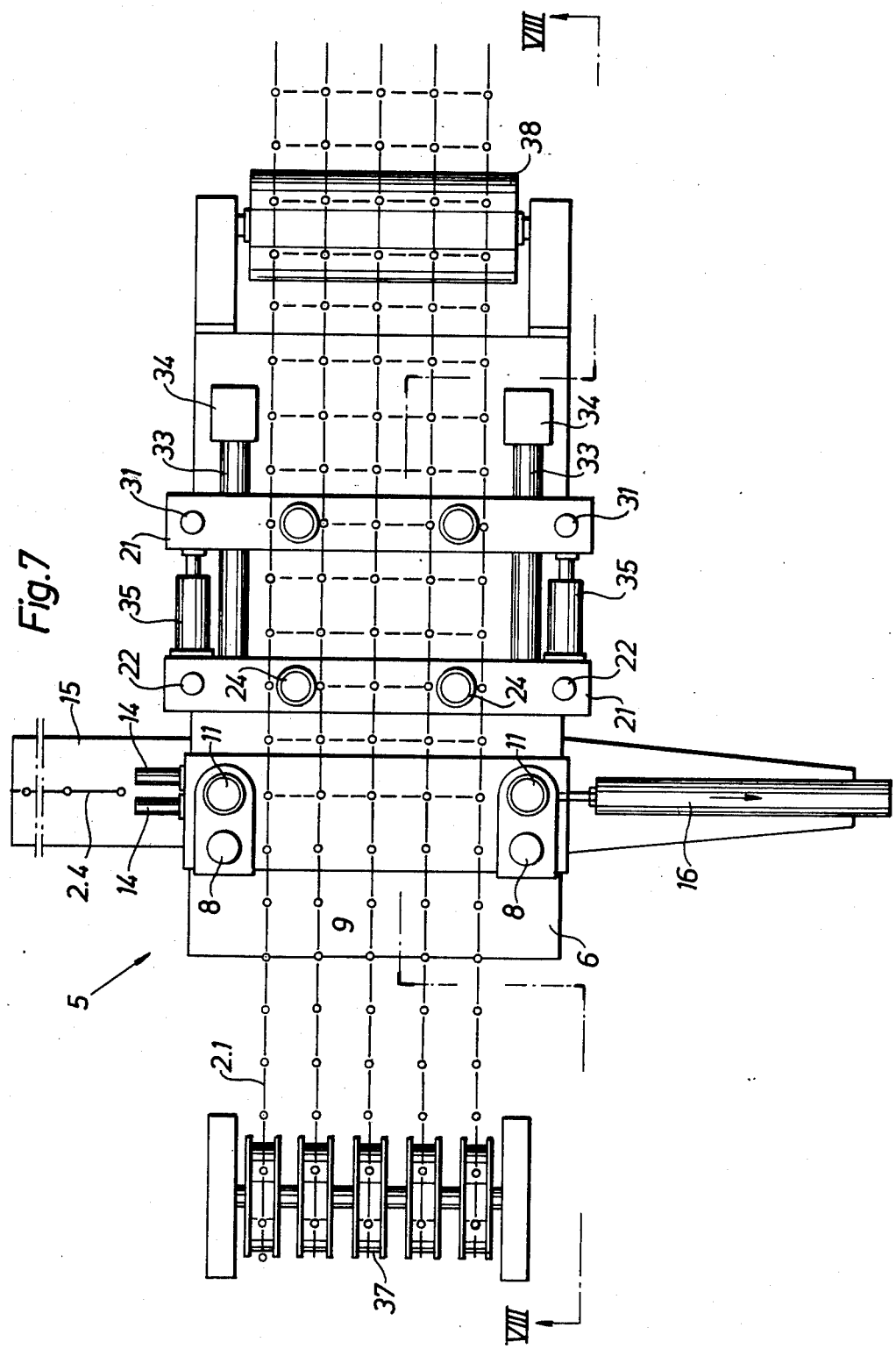
FIG. 7 is a plan of an apparatus for manufacturing chain net with advance of the warp strands in their longitudinal direction.
Figure 8:
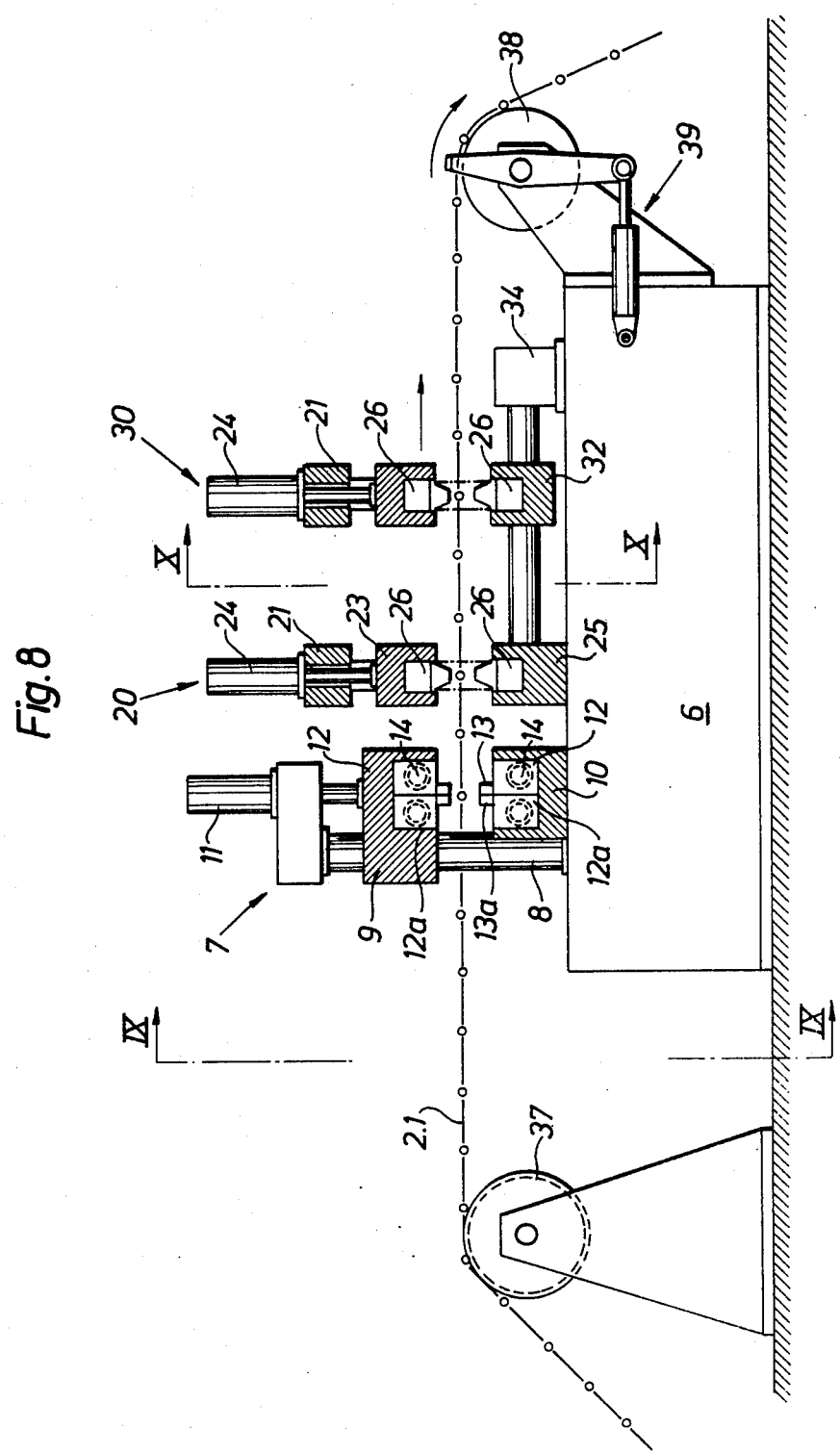
FIG. 8 is a side view of this apparatus, partially in section, along the line VIII—VIII in FIG. 7.
Figure 9:
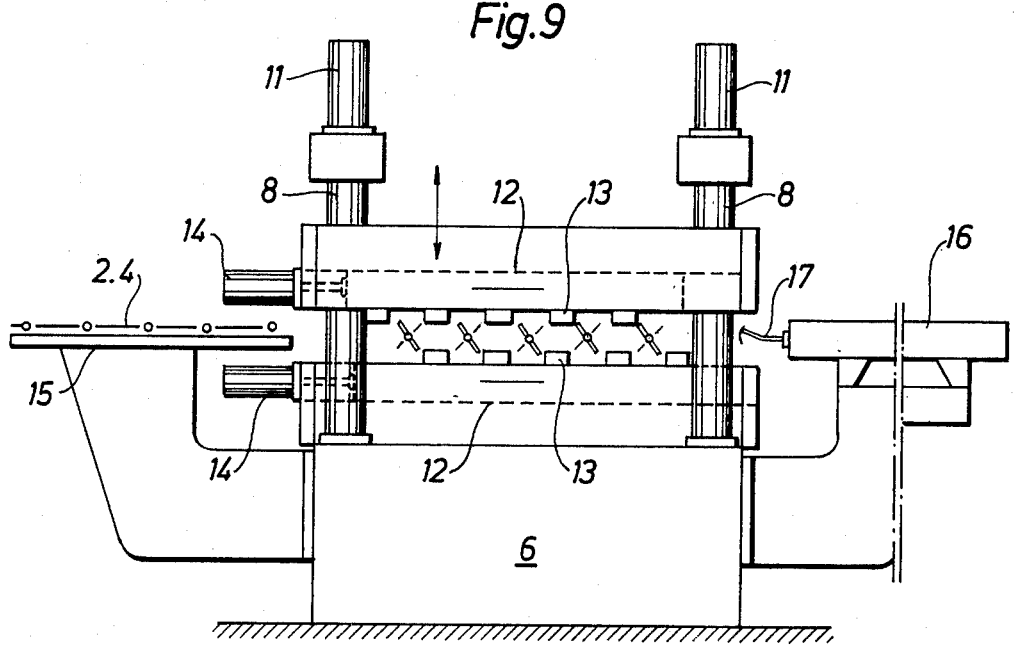
FIG. 9 illustrates the apparatus seen along the line IX—IX in FIG. 8.
Figure 10:
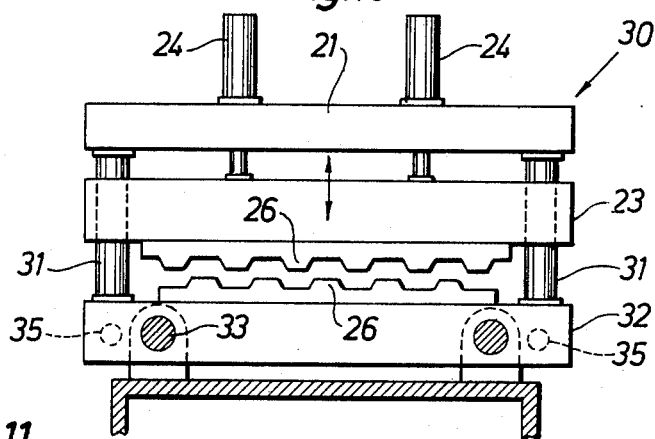
FIG. 10 is a section along the line X—X in FIG. 8.

FIG. 3 illustrates a further embodiment of the net in accordance with the invention. This net is generally denoted 3 and includes weft strands 3.4. Each warp link 3.2 locks around a weft link 3.5 and each such weft link is locked round by a warp link. As in the previous case, the warp links are at 45 degrees opposed slopes to the plane of the net, while the shanks 3.6 of the weft links are in the plane of the net. To enable this, the weft links 3.5 are formed with link shanks 3.6 pressed in opposite directions so that they can assume a position in the plane of the net, as more closely illustrated in FIGS. 5 and 6. The structure forms a relatively dense net mat and is particularly suitable in cases where relatively large stability and weight of the chain net are demanded.

The chain net 3 can be manufactured in a similar manner and of corresponding material as for the nets 1 and 2. Of particular interest are nets according to FIG. 3 made from buoyant material, which may suitably be an elastically deformable plastics. Alternatively, the links can be made from plastically deformable hollow sections so that the links are thus buoyant. Due to its dense structure this net has comparatively good buoyancy in water and is therefore suitable as a floating body for different purposes. The warp strands can be conventional plastic chains containing links capable of the necessary elastic change in shape and return to shape, while the weft strands are suitably formed conventionally as plastic chains containing special moulded links. No special demands on elastic deformability of the weft links need to be made.

Figure 4:
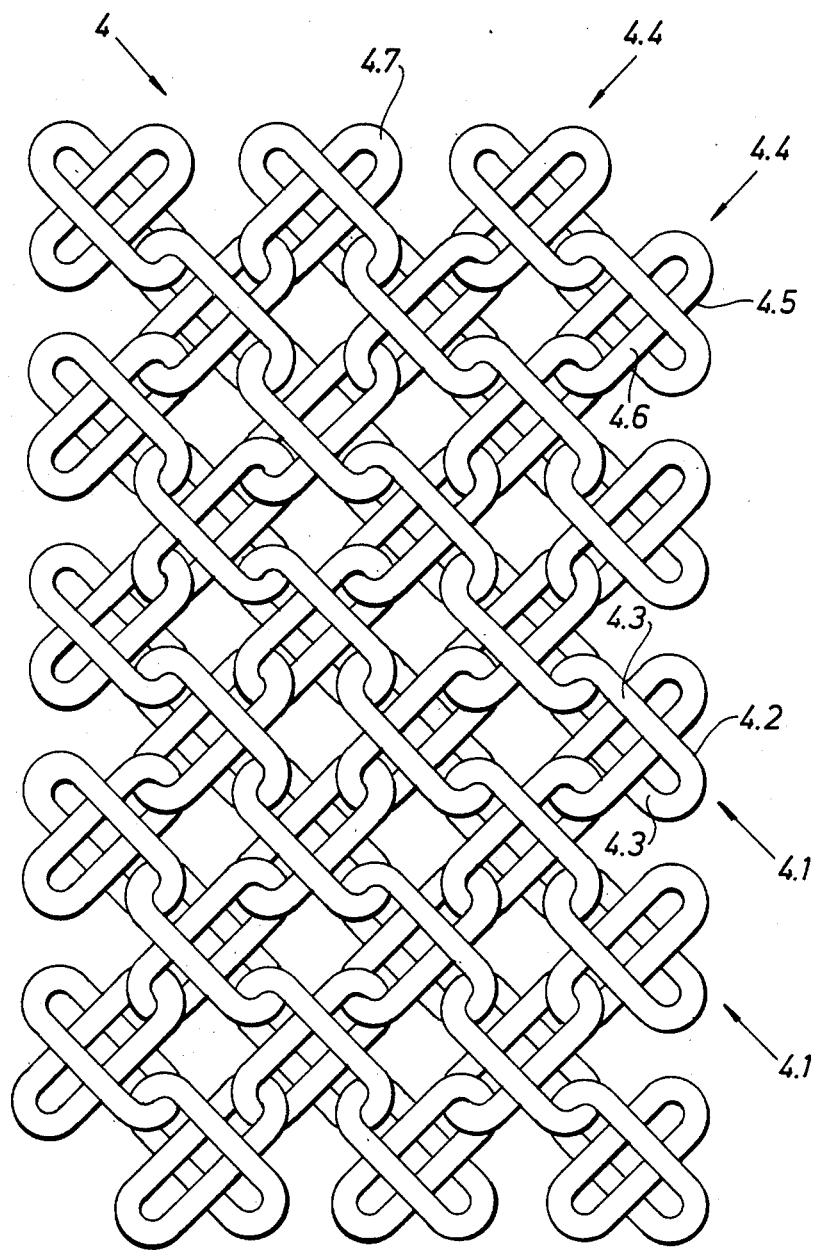
FIG. 4 illustrates a diagonal net with intersections at every link of the warp and weft strands.

FIG. 4 shows a diagonal net 4 according to the invention. The warp strands 4.1 here engage with the weft strands 4.4 in the same way as the net 3. The warp links 4.2 slope at 45 degrees to the plane of the net and surround the weft links 4.5 with pressed link shanks 4.6, which assume a position in the plane of the net. The bent end portions 4.7 at the ends of the weft strands prevent the surrounding warp link from gliding off the end link of the weft strand in this case as in the previous cases.

The diagonal net may also consist of warp and weft strands connected to each other in the same way as in the net 1 or 2.

FIGS. 7-12 illustrate an apparatus for manufacturing chain net in accordance with the invention with mutually parallel warp strands which are advanced in their longitudinal direction. The machine in question is generally denoted by 5. An aligning and drawing unit 7 is mounted on a bed 6 and includes two posts or guides 8 mounted vertically on either side of the manufactured net for guiding an upper vertically movable transverse beam 9. Vertical lifting cylinders 11 are connected to the upper ends of the guides 8 for movement of the beam 9. A fixed transverse beam 10 is mounted on the bed below the beam 9. Horizontally movable aligning slides 12,12a provided with mutually opposing abutments 13,13a are glidably mounted in pairs in the beams 9 and 10. The slides are operated with the aid of double-acting operating cylinders 14. The abutments 13,13a on the respective pairs of sides can be moved towards each other for aligning warp links (FIG. 12) which are between the slides. These warp links are included in warp strands (e.g. 2.1) which are advanced in the longitudinal direction of the machine and parallel to each other from a store via a roller 37 in a way described in detail below. Advancing takes place in parallel and stepwise so that the warp links simultaneously assume a position between the upper and the lower pair of aligning slides 12,12a. The slides are then adjusted by the action of the cylinders 14 to a position such that the abutments 13,13a allow the warp links to be inserted at an angle of 45 degrees, with a lower shank at a lower abutment and an upper shank at an upper abutment pertaining to the respective to slides 12,12 directly opposite slides 12a,12a. At one side of the unit 7 there is a table for weft strands, e.g. 2.4. The table 15 is at a height such that the weft strand is on a line through the center point of the aligned warp links. On the opposite side of the unit 7 there is a pulling cylinder 16 directed along said line through the warp links. The end of the cylinder piston rod is provided with a gripping hook 17. The stroke of the cylinder permits the gripping hook to be taken through and past the aligned warp links to reach the end of the weft strand 2.4. When the warp links are aligned with the aid of the slides 12,12a the warp links will assume a position with their broadsides opposing each other at right angles to a line through the center point of the inner opening of the warp links. The lifting cylinders 11 are adapted to exert an adjusting yielding pressure against the beam 9 so that the links can be erected to a vertical position under the action of the slides during yielding vertical displacement upwards of the beam 9.

Figure 11:
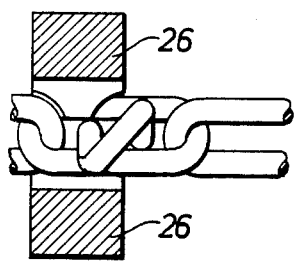
FIG. 11 is a detail to a larger scale of the gripping means for elongating the chain net.
Figure 12:
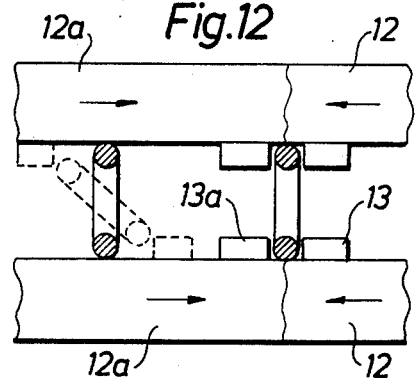
FIG. 12 is a detail to a larger scale of the aligning means for warp links.

After the unit 7 in the advancing direction of the net there is a fixed gripping unit 20. This includes an upper movable transverse beam 23 and a fixed upper transverse beam 21, the former being vertically movable along two vertical posts or guides 22. The guides 22 are on either side of the net and are fixed in a lower transverse beam 25 fastened to the bed. The upper beam 23 is vertically movable with the aid of two lifting cylinders 24 fixed to the beam 21. Gripping jaws 26 are mounted in the beams 23,25 and have mutually opposing gripping surfaces suited to gripping the warp strands 2.1, as illustrated in FIG. 11. The gripping jaws 26 are at a distance from the abutments 13,13a corresponding to a plurality of link pitches of the warp strand 2.1.

In the advancing direction of the net after the unit 20 there is an elongating or stretching apparatus of the same embodiment as the gripping unit 20, but arranged for horizontal displacement along two horizontal guides 33 on either side of the net which are mounted in the transverse fixed beam 25 at one end and special brackets 34 at the other. The elongation or stretching unit 30, in contradistinction to the gripping unit 20, thus has a lower movable beam 32 and movable vertical posts 31 while remaining parts are identical. The stretching or elongating unit 30 is also provided with identical gripping jaws 26 for the warp strands. Between the gripping unit 20 and the elongating unit 30 there are two elongating cylinders 35 on either side of the machine, with which the elongating unit can be moved horizontally for elongating the warp links between the gripping unit 20 and the elongating unit 30.

Finally, the machine 5 is provided with a discharge roll 38 and possibly a step feeding device connected to the roll for stepwise advance of the warp strands and net through the machine.

The apparatus functions in the following manner. Warp strands, (e.g. 2.1) are pulled out from a store over the rollers 37 through the aligning and drawing unit 7 to the elongation unit 30. The warp strands are gripped at their ends here by the upper gripping jaw 26 being taken towards the lower gripping jaw 26 with the aid of cylinders 24. In this position there are a plurality of warp links between the aligning slides 12,12a. In the manufacture of a type 2 net the warp links are at an angle of 45 degrees in either direction of slope to the horizontal plane and the beam 9 is lowered to an adjusted height for the opened abutments 13,13a to engage against the shanks of the warp links. Associated slides 12 and 12a, respectively, are activated so that all the warp links are erected to a vertical position from either sloping position. The beam 9 is raised yieldingly to the necessary extent for this. The warp links are now aligned. The pulling cylinder 16 is actuated so that its piston rod with the gripping hook 17 is taken through the aligned warp links up to the end of the weft strand, placed on the table 15, and grips its end link. The gripping hook 17 is then withdrawn and thus inserts the weft strands to a suitable position in which they will be within the respective warp links for the links intended to be surrounded. The warp links have a dimension such that the weft strand can be inserted through these links.

The gripping hook 17 is now disengaged from the weft strand, and the aligning slides 12,12a with the abutments 13,13a are removed from the warp strands so that these with the now-associated weft strand can be advanced further. This advance takes place with the aid of the elongating unit 30 and the elongating cylinders 35 to a position where the next series of warp links are in a position for alignment. The warp links are aligned and the next weft strand is inserted as described. After renewed advancing of the necessary number of pitches, the intersections first formed have reached the units 20 and 30 where they are gripped and retained. This advance suitably takes place so that the elongating unit 30 alternatingly grips and advances the warp strands one or more link pitches, after which the unit returns to repeat the advance. The section of the chain net between the units 20 and 30 with now-inserted weft strands is then subjected to elongation in the direction of the warp strands by the elongating unit 20 being moved in a direction away from the gripping unit 30 with the aid of the elongating cylinders 35.

The warp links will then lock around the weft links at the intersection points on the net and the net section between the units 20 and 30 is completed. The advancing sequence is repeated after the net has been released from the gripping unit 20 until new warp links are in position for aligning or until a prepared section of net is between the units 20 and 30 for elongation. The finished net is fed out over the discharge roll 38 and may fall downwards for further handling. In continuation, the downwardly directed part of the finished net keeps the section between either of the pairs of gripping jaws 26 and the discharging roll 38 tensioned by gravity to the necessary extent. In the stepwise advance the net is suitably gripped in the unit 20 when the unit 30 has released the net and is returning for a new grip.

Alternatively, a special step feeding device 39 may be connected to the discharge roll 38, the elongating unit 30 then not being used for stepwise advance of the net.

The operating cylinders for movement of the different parts of the machine can be hydraulically or pneumatically operated and controlled according to an electronically controlled operating program. The elongating cylinders 35 are preferably hydraulically actuated to develop the required, relatively large elongating forces.

I claim:

1. A chain net comprising: a plurality of warp strands, each warp strand consisting of a plurality of interconnected warp chain links of an elastically deformable material capable of being deformed by a deforming force and resuming an initial shape after the deforming force is removed; a plurality of weft strands, each weft strand consisting of a plurality of interconnected weft chain links; at least some of said warp chain links forming intersections with at least some of said weft links, respectively; each intersection consisting of a weft link inserted into a warp link and locked to the warp link by elongation and deformation of the warp link, said warp chain links when subject to said deformation being larger than said weft chain links when said weft chain links are initially inserted through warp chain links to be surrounded thereby so that said elongation of said warp chain links makes said warp chain links when resuming the initial shape, small enough to lock around said weft chain links in the formed chain net, all of said warp chain links being the same in the formed chain net and all of said weft chain links being the same in the formed chain net.

2. A chain net as claimed in claim 1, wherein the chain net has an elongate, substantially rectangular plan profile, the warp strands running in the longitudinal direction of the net being of successively increased longitudinal length counted from long sides of the net to the center thereof.

3. A chain net as claimed in claim 1, wherein the chain net has a substantially rectangular plan profile, the warp strands and the weft strands being elongated so that chain strands between corners of the profile have a relatively least length and the chain strands closer to the respective center lines of the profile have successively increasing length.

4. A chain net as claimed in claim 1, wherein the chain net has an elongate, substantially rectangular plan profile, the warp strands and weft strands extending diagonally in opposing nearly equal slopes towards long sides of the net.

5. A chain net comprising: a plurality of warp strands, each warp strand consisting of a plurality of interconnected warp chain links of a plastically deformable material capable of being deformed by a deforming force and assuming a final shape after the deforming force is removed; a plurality of weft strands, each weft strand consisting of a plurality of interconnected weft chain links; at least some of said warp links forming intersections with at least some of said weft links, respectively; each intersection consisting of a weft link inserted into a warp link and locked to the warp link by elongation and plastic deformation of the warp link, said warp chain links being larger than said weft chain links when said weft chain links are initially inserted through warp chain links to be surrounded thereby so that said plastic deformation makes said warp chain links small enough to lock around said weft chain links in the formed chain net, all of said warp chain links being the same in the formed chain net and all of said weft chain links being the same in the formed chain net.

6. A chain net as claimed in claim 1, wherein the warp strands consist of plastics, rubber or other elastically deformable synthetic material.

7. A chain net as claimed in claim 1, wherein the warp strands and weft strands consist of plastics, rubber or other elastically deformable synthetic material.

8. A chain net as claimed in claim 6, wherein said material has a specific gravity of less than 1.

9. A chain net as claimed in claim 7, wherein said material has a specific gravity of less than 1.

* * * * *